Patented Mar. 13, 1928.

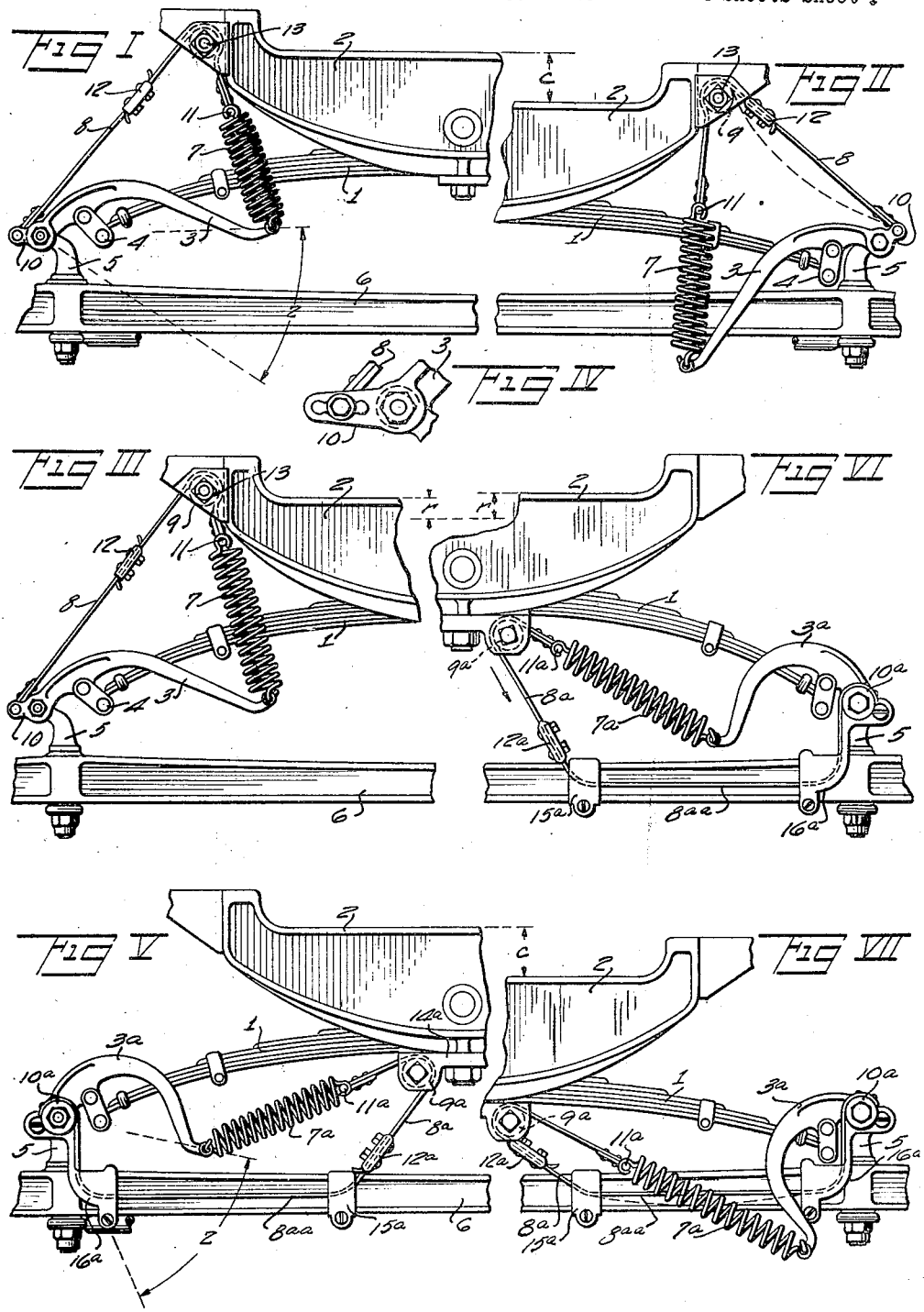

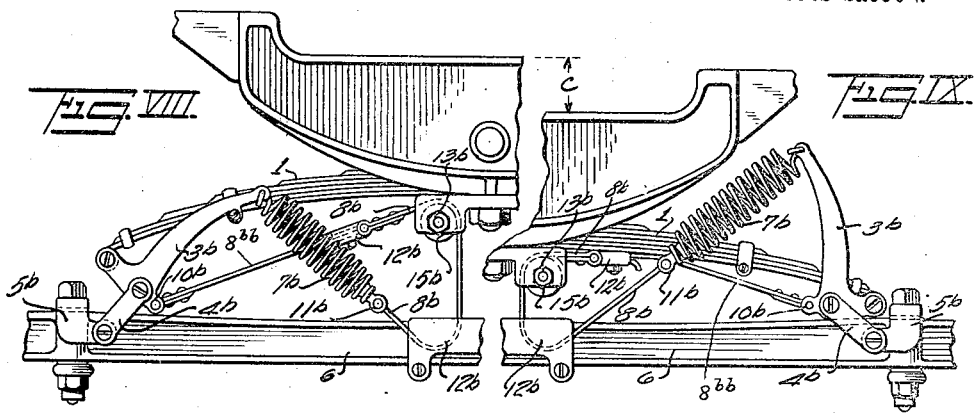

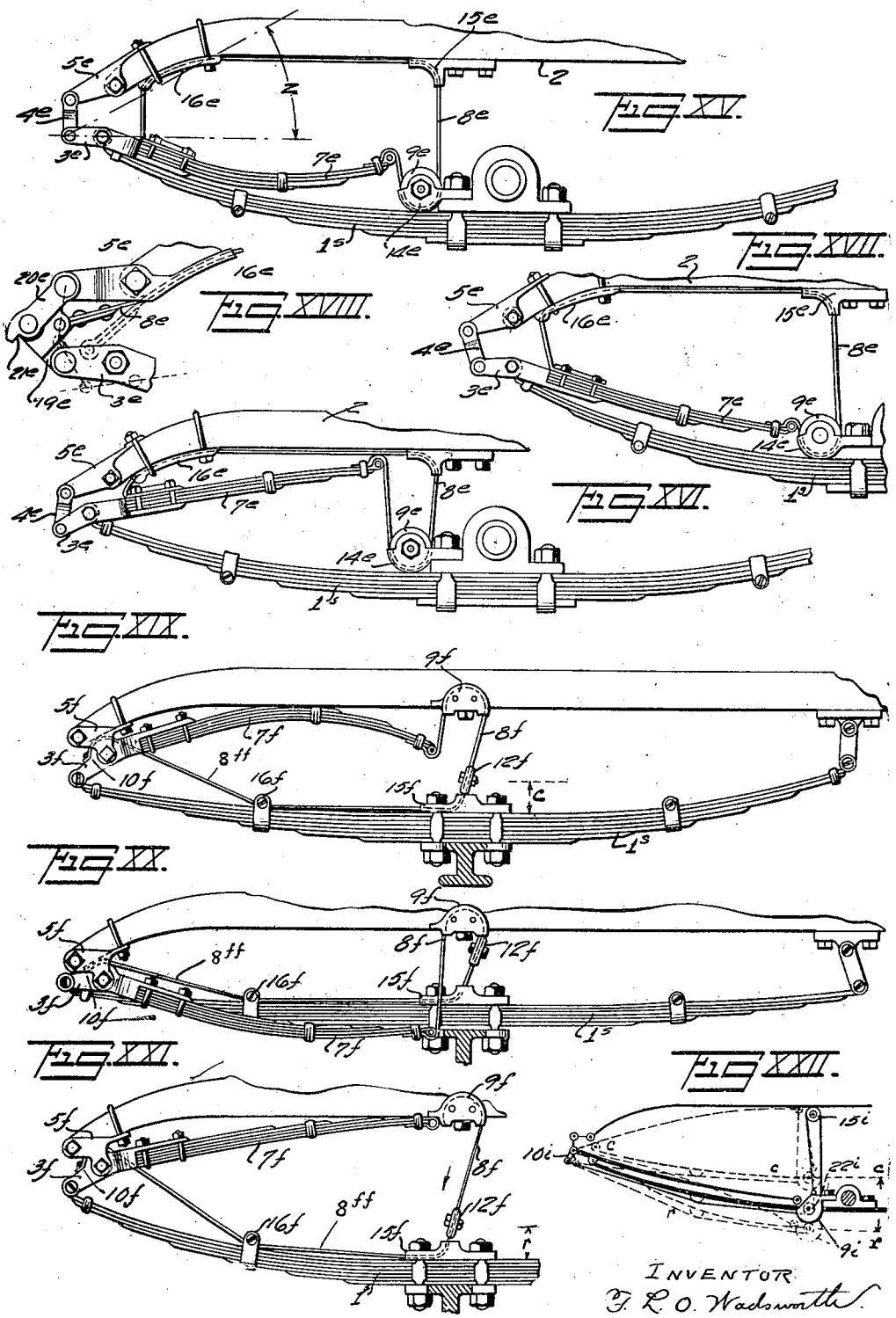

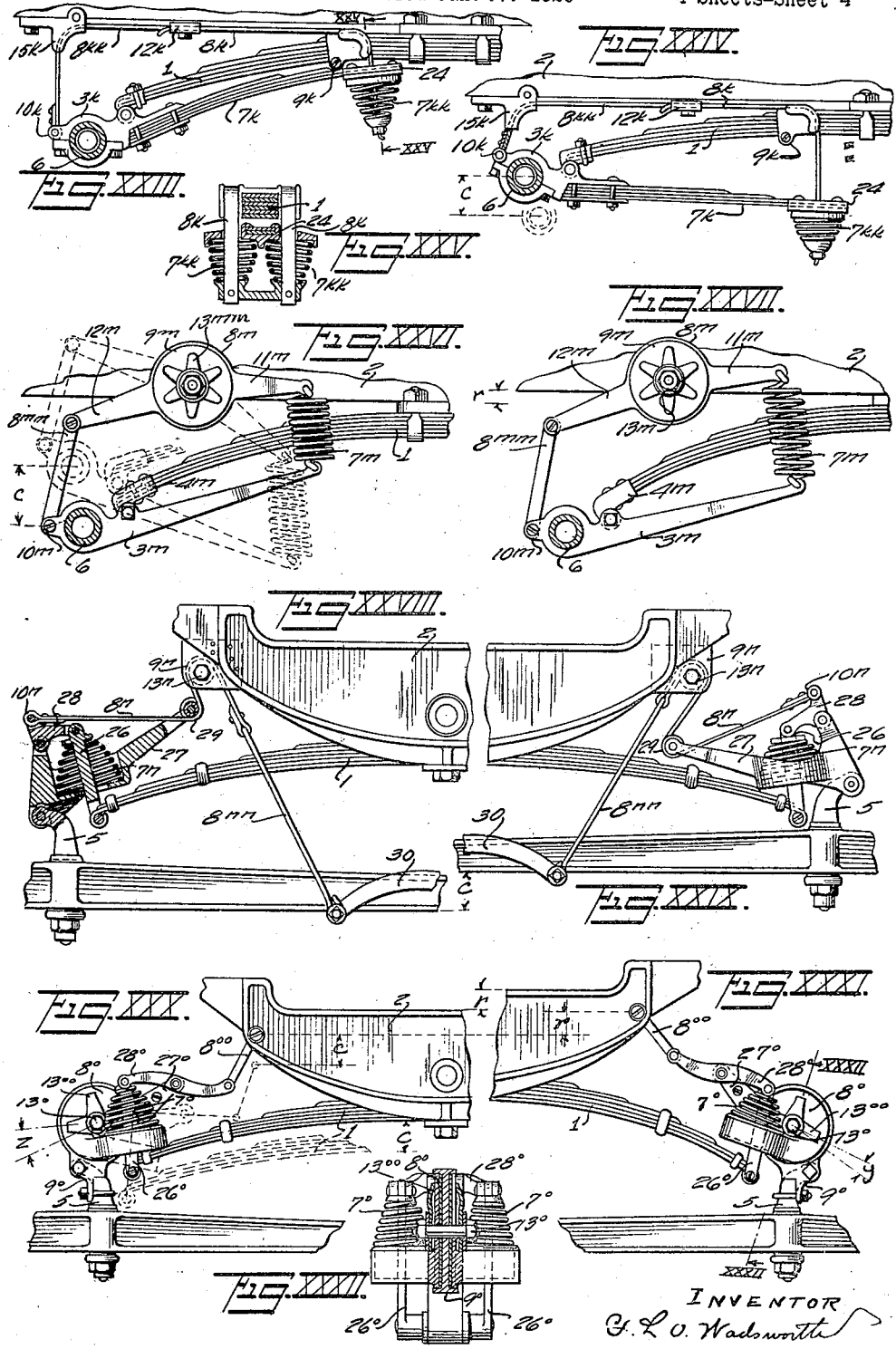

1,662,351

UNITED STATES PATENT OFFICE.

FRANK L. O. WADSWORTH, OF PITTSBURGH, PENNSYLVANIA.

SUPPLEMENTAL SPRING SNUBBING SUSPENSION FOR VEHICLES.

Application filed January 30, 1926. Serial No. 84,993.

My invention relates to that general class of devices which are adapted to cushion and absorb the effects of relative movements between two elastically connected structures—such for example as the body and axle members of a road vehicle—and thereby minimize the degree of oscillation or vibration which is produced in one of these members (e. g. the body portion of the vehicle) by the relative displacement of the other member from its normal position with respect to the first.

The ordinary spring suspension system for vehicle bodies comprises two or more leaf springs interposed between the tonneau and the running gear frames, with the thickened parts of the springs rigidly bolted to one of these frames, and with the thinner and more flexible extremities thereof pivotally connected or shackled to the other relatively movable portion of the chassis assemblage. When the system is at rest the elastic suspension elements are subjected to the dead load or weight of the vehicle body, and its contends; and are thereby bent or flexed by a certain amount—which is designated as the normal load flexure of the springs—that is proportioned to the elastic modulus, or resistance, of the spring supports. If one of the parts of the complete assemblage is suddenly moved with respect to the other the effect of inertia or static momentum retards and reduces the accompanying or attendant displacement of the other spring connected part; and the resultant change in the relative positions of the body and axle members produces a corresponding change in the form and tension of the normally flexed springs, which will disturb the conditions of static equilibrium, and will accordingly tend to set up undesirable vibrations in both of the moving members and thus induce a still more objectionable oscillation of the vehicle tonneau. These effects—which are dependent first on the mass, and the velocity of relative displacement, of the spring connected parts, and second on the proportional change in the elastic resistance and reaction of the abnormally flexed spring supports during such displacements—will be reduced by the use of what are termed "soft" springs: which will permit of a relatively large change in the relative separation of the body and axle members without any large change in the flexural strain on the stressed suspension elements. This "softness" of action can be obtained to some extent by the use of very long springs—which will permit a large lineal movement of the spring connected parts without producing any large variation in the normal flexural strain on the springs—or by the use of very flexible springs—in which the ratio between the elastic displacement and the imposed stress and strain is correspondingly large—but the extent of the relief so obtained is limited, in the case of leaf springs, by practical requirements as to compactness of construction and safety of operation under widely varying body loads. These practical conditions necessitate the use of fairly short and fairly stiff main leaf springs—whether these be of the full elliptic, the semi-elliptic, or of the quarter elliptic (cantilever) form of construction—and such springs will not, under ordinary conditions, properly cushion and absorb all of the varying shocks of road travel. It has therefore been found desirable to complement the action of such springs by the use of supplemental spring supports of various kinds, which are interposed in series between a part of the main spring (e. g. the center, or ends) and that portion of the chassis to which the said part is ordinarily connected; and which serve to increase the effective range of elastic absorption of displacement stresses under compressive shocks. But this increased cushioning effect under a kinetic increase in load (e. g. a compressive shock induced by the passage of the vehicle wheels over an obstruction or "bump" in the road surface) is not alone sufficient to protect the occupants of the vehicle against discomfort; because any increased compression of the spring support system—beyond normal load flexure—tends to move the body upward, and is necessarily followed, when the abnormal stress is relieved, by a recoil of the abnormally flexed elastic elements toward the position of static equilibrium. The kinetic momentum, or inertia, of the upwardly moving body and of the recoiling spring elements will, unless checked, carry the parts beyond normal load position; and produce a rebound, or tossing movement, which may, in some cases, be so severe as to throw the occupants of the tonneau from their seats, and which will, in all cases, tend to interfere with the stability and the steering control of the moving vehicle. To avoid or minimize this effect various forms of rebound check or "snubbing"

devices have been applied to the elastic elements of the suspension system; and the most complete and generally satisfactory arrangement, which has thus far been developed, for cushioning and absorbing all of the varying shocks and disturbances of road travel is one in which a proper form of series supplemental spring support for the main spring is combined with a cooperating device for retarding or "snubbing" the recoil of the primary elastic support from an abnormally flexed position.

Such an arrangement as the one last described is termed a supplemental spring snubbing suspension system; and it is to such a system that this invention particularly relates. The primary purpose and object of the present improvements is to substantially increase the relatively free movements of the vehicle axle with respect to the body members, without increasing either the dimensions or the flexibility—or more generally stated the elastic modulus—of the spring suspension elements; and to concurrently increase the effectiveness of the snubbing action on the recoiling springs as the range of flexural displacement increases. The generic mode of accomplishing this purpose—and the various specific features and advantages of my invention—will be readily understood, and fully appreciated by those skilled in this art, from the following description of various exemplary embodiments of my improved construction, as illustrated in the accompanying drawings, in which:

Fig. I is a front elevation of one side of a cross leaf spring suspension that is provided with my improved form of complemental cushioning and snubbing attachment, and Figs. II and III are similar views of this same construction with the parts in the positions which they assume when the system is subjected, respectively, to kinetic compression forces and rebound stresses; Fig. IV is an enlarged detail of an adjustable strap connection; Fig. V shows another application of my invention to a cross leaf spring support with the parts in normal load position (as in Fig. I), and Figs. VI and VII are other views of this second embodiment which illustrate the relative changes in the relationship of the operative elements when the body and axle members are moved in opposite directions from the aforesaid position (during rebound and compression movements); Figs. VIII and IX each depict one side of a third complemental suspension system of the same general character as that shown in Figs. I to VII, with the parts in normal load position (Fig. VIII) and in compressed position (Fig. IX); Fig. X illustrates a fourth exemplification of my improvements with the spring elements thereof in static equilibrium, and Fig. XI shows the change in the relationship of these same elements when they are subjected to kinetic compression stresses; Fig. XII is a cross sectional view of a part of the construction shown in Fig. IX (on the plane XII—XII of that figure); Figs. XIII and XIV are illustrations of still another form of my improved suspension system in which volute compression springs are used as the supplemental elastic elements of the structure;—these figures showing respectively the relationship of the parts under normal load and under a kinetic compression stress; Fig. XV illustrates the application of my invention to an ordinary semi-elliptic side spring support with the parts thereof in the position of static equilibrium, and Figs. XVI and XVII are corresponding views of this same system with the parts thereof in the positions which they assume under an increased kinetic load and during rebound movements; Fig. XVIII is a detail view of a modification of one part of the construction shown in Figs. XV, XVI and XVII; Figs. XIX, XX and XXI are three views similar to those of Figs. XV, XVI and XVII which illustrate another exemplification of my improvements as applied to side leaf spring suspensions; Fig. XXII is a semi-diagrammatic view of a third side leaf spring support embodying my improvements, and showing the relative relationship of the elastic support elements both under normal load (full lines) and under opposing displacement stresses (dotted lines); Fig. XXIII depicts the application of my improvements to a quarter elliptic or cantilever leaf spring support, with the parts in the position of static equilibrium, and Fig. XXIV is a second view of this same cantilever support system with the parts in the positions which they assume under increased load; Fig. XXV in a cross section on the plane XXV—XXV of Fig. XXIII; Figs. XXVI and XXVII are side views of another quarter-elliptic, or cantilever spring, support system which also embodies my invention and show the elements thereof in the same relative positions as are illustrated respectively in Figs. XIII and XIV: Fig. XXVIII is a front elevation (similar to those of Figs. I to XIV supra) which exemplifies the application of my improvements to a supplemental spring suspension system of the direct end support type—(the parts being there shown in their normal load relationship)—and Fig. XXIX illustrates the change in the relative position of the cooperating members of this system when it is subjected to kinetic compression stresses; Fig. XXX is another end elevation of an alternative form of this end support type of construction, which shows the parts in the position of static equilibrium and also indicates diagrammatically (in dotted lines) the relative movements which are produced by the application of an increased kinetic load; Fig. XXXI is an additional view of this same construction which illustrates the action of the suspension elements when the body and axle members rebound or separate beyond normal load position; and Fig. XXXII is a cross section, on the plane XXXII—XXXII of Fig. XXXI, which illustrates certain structural details of this last described embodiment of my invention.

In the construction shown in Figs. I, II and III the main cross leaf spring 1 is bolted rigidly, at its center, to the body frame 2 of the vehicle, and is flexibly connected, at its extremities, to the lever elements 3—3 by means of the shackle links, 4—4. The levers 3 are pivotally mounted, at their outer ends, on the reversed axle perches, 5—5; and are suitably coupled, at their inner ends, to the lower extremities of the supplemental coil tension springs, 7—7. These secondary elastic support members are not directly connected to, or supported on, any fixed portion of the axle or body frames—as in the usual forms of lever actuated supplemental spring suspension system—but are connected, at their upper ends, to flexible straps 8—8 which pass over friction drums 9—9, mounted at the sides of the body frame 2; and which are suitably attached, at their outer terminals, to short arms 10—10 that project from the hub portions of the levers 3—3. These latter elements may be of the single arm type—in which case only one supplemental spring 7 is attached to the inner end of each lever—but they are preferably provided with twin arms which extend inwardly on opposite sides of the main spring 1, and are there connected to a cooperating pair of supplemental springs, 7—7 that are also symmetrically disposed, one on each side of the main spring. The upper ends of the supplemental coil springs may be attached, by the cross pin 11, to a single centrally disposed strap 8; or the latter element may itself be divided (at its inner end) and each of the divided ends similarly attached to the contiguous coil. In either case the inner and outer portions of the strap elements are preferably composed of two sections which are united by the coupling blocks 12, that serve both to adjust the initial overall length of these united sections—(when the parts are first assembled in normal load position)—and also permit of subsequently taking up any stretch due to use, or of any subsequent adjustment that may be required by different conditions of operation. The drums 9—9 are also provided with means—such as the bolts 13, 13—for altering the degree of frictional resistance which these drums offer to rotation, or to the relative longitudinal movement of the strap elements, 8—8; and the outer portions of these straps may be coupled to the arms 10—10 by adjustable bolt and slot connections (such as are shown in enlarged detail in Fig. IV) so as to vary, at will, the moment arm of the strap tension on the lever members 3—10.

The general mode of operation of this improved type of supplemental spring snubber organization is as follows: When the system is subjected to a kinetic increase in load—e. g. to a compressive shock such as is imposed on the system by the passage of the vehicle wheels over a sharp elevation, or "bump" in the road surface—the body and axle parts are moved toward each other, and the downward pull of the shackle links 4—4, on the lever elements 3—3, rock the latter in a corresponding direction; thereby imposing an increased tension on the supplemental coil springs 7—7. The relative approach of the body and axle members permits the strap elements 8—8, to slide freely over their friction drum supports 9—9, under the pull of the supplemental springs on the inner ends thereof; but the parts are so proportioned that the longitudinal movements of the straps are less in amount than the arcuate movement of the ends of the levers 3—3; and the springs 7—7 are therefore proportionally elongated and increasingly flexed as the compression movement continues. The ratio between the vertical movement of the axle, (with respect to the body of the vehicle), and the attendant increase in flexure of the elastic suspension elements is however much less than it is in the ordinary forms of construction, in which the supplemental spring supports are fixedly attached to either the axle or the body frames; and because of this any given change in the relative positions of the spring connected body and axle parts is accompanied by a correspondingly smaller variation in spring resistance to such movement. Or stated in another way, the elastic resistance to relative up and down movements of the axle remains more nearly constant in my improved construction than it does in the forms of supplemental spring suspension that are ordinarily employed; and the reaction or recoil strains that are imposed on the spring suspension elements (for a given compression movement of the system) are correspondingly reduced. This, in itself, diminished the tendency of the compressed system to quick and violent recoil when the kinetic compression stresses are reduced or removed and the parts begin to return to their normal load positions. But in my improved construction this recoil action is further retarded and damped by the coaction of the cooperating spring-strap-and-drum elements 7, 8 and 9. Whenever the body and axle members move, or tend to move, away from each other the flexible connectors 8 are drawn tightly in contact with their friction drum supports 9 by the elastic pull of the tensioned springs 7—7 on the inner ends of these straps, and by the fixed pull of the lever connections on the outer ends thereof—and there will be a longitudinal movement of these straps with respect to their drum supports, which will be resisted, either by the frictional drag of the straps on the drums or by the preadjusted friction between the latter and their supports. This frictional damping effect on the recoil of the compressed spring system will be proportioned to the extent of the compression movement—because the tensioned pull on the inner ends of the straps is proportioned to the increased flexure of the supplemental springs, 7, 7—and will be greatest at the beginning of the recoil movement. As this movement continues the tension in the supplemental spring elements is gradually reduced as the parts return toward normal load position; but the return movement of the lever-spring-system 3—7 is itself controlled by the pull of the outer ends of the straps on the lever extensions, 10—10; and the relative effects of the combined spring and friction resistance to recoil may be varied, at will, by the adjustment of the drum friction (e. g. by the bolts 12) and of the moment arm of the strap tension on the said lever extensions. When the parts have returned to the normal load position shown in Fig. I any further separation, or rebound, of the body and axle members toward the position shown in Fig. III is progressively resisted, first, by the continued longitudinal slip of the straps 8, on the drum supports 9, and second, by the pull of the outer ends of the straps on their lever connections—(which tends to either hold the lever elements stationary, or move them in the same direction in which they are moved during compression movements)—and the resultant extension or increased flexure of the elastic suspension coils 7—7. In this case the resistance to rebound—as contrasted with the resistance to recoil to normal load position—progressively increases as the separation of the body and axle members continues; because such separation imposes a continually augmented flexure on the supplemental springs 7—7, and a correspondingly increased pull on the inner ends of the strap members 8—8; and any abnormal or unusual rebound movement is therefore very quickly checked and arrested by these progressively increased resistances.

In my improved system excessive movements of the spring connected parts in either direction from normal load position can also be quickly checked by proper positioning of the pin connections, 11, and the coupling blocks, 12, with respect to the friction drum supports. When the body and axle members have been moved toward each other to the extent indicated in Fig. II, the coupling blocks, 12, are brought into contact with the frame supports for the drums, 9; and when this occurs the free sliding movement of the straps 8 on the drum supports 9 is arrested, and the upper ends of the supplemental springs 7—7 are then held in fixed longitudinal relationship with the body frame; and further compressive movement results in a substantially increased rate of extension or flexure of the supplemental elastic supports (and of the main spring, 1, which is coupled in series therewith) as the axle and body members approach each other.

On the other hand, when the rebound movement carries the parts beyond the position shown in Fig. III the pins, 11—or the contiguous strap end connections—are brought in contact with the drum supports 9, and the sliding movement of the straps 8, on the drums 9, is again arrested. When this happens the outer portions of these straps act as longitudinally rigid connectors; and further rebound movement produces a relatively large angular motion of the lever elements 3—3 on their axle perch supports 5—5, and a very rapid increase in the flexure of the supplemental springs 7—7, that will more than compensate for the elimination of the frictional component of restraint to such movement.

The form of construction shown in Figs. V, VI and VII differs from the one just described only in details of arrangement of the various cooperating parts. In this second illustrative embodiment of my improvements the outer extremities of the main cross leaf spring 1 are shackled to twin arm levers 3ª—3ª, which are pivotally supported on the reversed axle perches 5—5, and are connected, at their inner ends, to supplemental tension springs 7ª—7ª, that are arranged in pairs on opposite sides of the main spring. The upper ends of each pair of secondary elastic suspension elements are attached, by a cross pin 11ª, to a single flexible strap or band 8ª, which passes over a drum 9ª, that is frictionally clamped against downwardly projecting end flanges or ears on the body frame bracket 14ª; and the opposite end of this strap is coupled, by the block 12ª, to a pair of strap extensions 8ªª—8ªª, which pass downwardly, outwardly and upwardly, around guide blocks 15ª—16ª, that are bolted to the axle frame members, 6—5, and are attached, at their outer extremities, to the hubs 10ª of the associated lever element 3ª. The mode of operation of this organization is in all respects the same as that of the first described construction. On compression movements—which carry the parts from the position shown in Fig. V toward, and to, that depicted in Fig. VII—the lever elements 3ª—3ª are rocked downwardly (through the angle $z$), and the approach of the body and axle members (2—9ª—14ª and 6—15ª—16ª) permits the straps 8ª—8ᵃᵃ to slide freely over their drum and guide supports under the pull of the connected lever-spring elements 3ª—7ª. But the strap movement is less in amount than the lever movement, and the spring suspension members are thus subjected to a gradually increased flexure that serves to stabilize and cushion the action of the system in absorbing compression shocks. When the relative approach of the tonneau and running gear frames has permitted the coupling blocks 12ª to engage the drum brackets 14ª the longitudinal movement of the flexible strap supports for the upper ends of the springs 7ª is arrested and the continued arcuate movement of the levers 3ª induces an accelerated rate of flexure in the elastic suspension members that will strongly resist any unusual or excessive compression of the system. The recoil of the compressed springs—and the return of the parts from the position shown in Fig. VII to that of Fig. V—is damped, as before explained, by the progressively decelerated action of the cooperating spring and friction elements 7ª—8ª—9ª etc; and when the body and axle members have reached the normal load position, any rebound or separation of these members beyond that position—and toward or to the position depicted in Fig. VI—is strongly restrained by the combined frictional resistance to relative movements of the strap and drum members 8ª—9ª etc. and the coincident flexural extension of the springs 7ª—7ª. When this movement has brought the outer ends of the strap end connection 8ª—11ª into engagement with the adjacent sides of the body brackets 14ª, (or with the surface of the drums 9ª), the further sliding of the straps on these drums is arrested; and the outer portions of the flexible connectors 8ª—8ᵃᵃ then act as longitudinally rigid tension couplings to transmit movement from the body frame to the axle supported levers 3ª—3ª, and produce a greatly augmented angular motion of the latter with a correspondingly accelerated extension and flexure of the supplemental springs 7ª—7ª.

In the organization depicted in Figs. VIII and IX the adjacent outer ends of the main cross leaf spring 1 and of the twin arm lever elements 3ᵇ—3ᵇ are pivotally connected to each other; and the intermediate portions of the latter members are flexibly shackled to the axle 6 by means of the swinging links 4ᵇ—4ᵇ and the axle perch brackets 5ᵇ—5ᵇ. The inner ends of the lever arms are connected to supplemental coil springs 7ᵇ—7ᵇ which are arranged in pairs on opposite sides of the primary suspension member; and the lower heads 11ᵇ of the secondary coil springs are each clamped to a strap element 8ᵇ which passes down under a curved friction-guide block 12ᵇ (that is bolted to the axle member 6) then up over a roller guide block 15ᵇ (that is secured to the body frame 1), and is then attached—with its fellow member on the opposite side of the main spring—to a single strap extension 8ᵇᵇ by means of the coupling member 12ᵇ. The extension 8ᵇᵇ, is connected, at its outer end, to the lever 3ᵇ at the point 10ᵇ—this connection being preferably of the radially adjustable character shown in Fig. IV—and the roller guides 15ᵇ are provided with means, such as the bolts and nuts 13ᵇ, whereby the frictional resistance to the rotation of these elements, (and the attendant restraint on the movement of the strap elements 8ᵇ thereon or thereover), may be considerably varied for the purposes previously explained in the description of the first exemplary embodiment of my improvements.

The generic functional action of this last described organization is essentially identical with that which characterizes the previously considered exemplifications of the present invention; but the relative movements of the parts is somewhat different in the two forms of construction. In the arrangement now under consideration the approach of the body and axle members, 1 and 6, rocks the levers 3ᵇ—3ᵇ upwardly and outwardly, and permits the lower ends of the strap elements 8ᵇ, (and the contiguous spring heads 11ᵇ which are attached thereto), to concurrently move in the same direction at a lesser rate of speed—thus causing the elastic suspension elements to be gradually elongated and further flexed as the compression movement continues. When the parts have reached the stage, or phase, of approach movement which is shown in Fig. IX the coupled ends of the strap elements 8ᵇ—8ᵇᵇ have been drawn against the adjacent faces of the body frame guides 15ᵇ—15ᵇ; and the cross pins which connect the lower heads 11ᵇ of each pair of springs 7ᵇ—and which engage the outer portions of the straps 8ᵇᵇ—8ᵇᵇ during the upward (compression) movement of these heads—have been concurrently engaged with the lower side of the oppositely moving main spring. Any further approach movement of the parts is then more strongly resisted by a greatly increased rate of flexure of the elastic suspension elements. Recoil and rebound movements of the spring supports, and of the spring connected tonneau and running gear frames, are restrained and checked—in the manner heretofore explained—by the combined frictional and elastic resistances that are exercised by the cooperating spring, strap and drum elements (7ᵇ, 8ᵇ, 8ᵇᵇ, 9ᵇ, 15ᵇ, etc.) when the body and axle members are moved away from one another.

Figs. X, XI and XII show a fourth embodiment of my improved supplemental spring snubber suspension system in which each of the lever elements $3^c$ is pivotally connected, at an intermediate point in its length, with the adjacent eye end of the main leaf spring 1, and is supported, at its inner extremity, on a pair of flexible spring shackles $4^c$, that are mounted on opposite sides of the axle 6, and are secured thereto by the clip brackets $5^c$. The upper forked ends of each lever are attached to the outer extremities of a pair of supplemental coil springs $7^c$—$7^c$; and the inner ends of these springs are connected to a cross bar $11^c$ which is secured to the edges of a pair of friction disc elements $8^c$. The discs $8^c$ are recessed on their inner faces and are rotatably held in frictional engagement with a central drum member $9^c$, that is clamped to the intermediate and relatively stiff portion of the main spring 1;— the degree of frictional grip between the engaged parts being regulated by means of the adjustable bolt and nut member $13^c$ and the spring washers $13^{cc}$. The peripheral edges of these rotatable members are also grooved to receive a pair of narrow strap or coil connections $8^{cc}$—$8^{cc}$, which are attached at their ends to the discs and are passed downwardly—around the guide rolls $15^c$ on each side of the axle 6—and then outwardly to a common link connection with the lower end $10^c$ of the lever $3^c$. When the body and axle members are moved toward each other the pressure of the outer extremities of the main leaf spring, on their lever connections, rotate the members $3^c$ outwardly on the pivot supports at the upper ends of the spring shackles $5^c$, and impose an increased tension on the supplemental springs $7^c$. But this approach movement also permits the disc elements $8^c$ to rotate on the drum supports $9^c$—as the strap or cord connections $8^{cc}$ are slackened and wound up on the grooved edges of the discs—and thus decreases the amount of flexure that would otherwise be imposed on the supplemental suspension elements;—thereby decreasing, in effect, the elastic modulus of the system, and securing a larger range of axle movement for a given change in elastic resistance to compression. The frictional restraint on the rotation of the discs $8^c$ is preferably so adjusted, (by means of the nut and washer elements $13^c$—$13^{cc}$), that the normal pull of the springs $7^c$ is sufficient to completely overcome this resistance, and thereby insure the continued maintenance of some tension in the connectors $8^{cc}$ at all stages of the compression movement up to that illustrated in Fig. XI. When this point is reached the cross bars $11^c$, to which the inner ends of the springs $7^c$ are attached, come into engagement with the projecting edges of the brackets $9^c$ (which rest on the upper side of the main spring, 1) and thus prevent further rotation of the disc elements $8^c$. Any further approach of the body and axle parts then imposes a greatly increased rate of flexure on the elastic suspension elements. When the body and axle members are separated the pull of the flexible connectors $8^{cc}$ on the peripheries of the disc $8^c$, and on the lower ends of the levers $3^c$, rotate, or tend to rotate, these elements in opposite directions; and these reversed movements are damped and checked both by the frictional resistance between the members, $8^c$—$9^c$, $8^{cc}$—$15^c$, and also by the elastic resistance of the supplemental springs $7^c$. When the recoil movement has returned the parts to normal load position, (Fig. X), any further separation, or rebound, of the body and axle members accentuates and rapidly increases this combined friction-spring resistance— because the extension or augmented flexure of the springs $7^c$ is then progressively accelerated as the rebound movement continues— and when this movement has again brought the cross bars $11^c$ into engagement with the main spring, any further reverse rotation of the discs $8^c$ is arrested, and the pull on the longitudinally rigid connections $8^{cc}$—$10^c$ then becomes effective in producing a large angular movement of the levers $3^c$, and a correspondingly increased rate of flexure in the springs $7^c$.

Figs. XIII and XIV illustrate another structural modification of the parts of my improved supplemental spring-snubber suspension. In this modification the levers $3^d$ are pivotally supported at their outer extremities on the reverse axle perches 5, (as in Figs. I, II and III), and are connected, at intermediate points in their length, with the adjacent eye ends of the main leaf spring 1 by means of swinging shackle links 4. The inner end of each of these levers is pivotally connected with a cross head which engages the upper ends of a pair of volute coil compression springs, that are symmetrically disposed on opposite sides of the main leaf spring. The lower ends of these secondary suspension elements are supported in cups that are carried by a rocking lever support $11^d$, which is pivoted at its outer end on the lower pintle connection of the shackle links 4. The inner ends of the lever support $11^d$ are connected to the adjacent extremities of a pair of flexible strap or cord connections $8^d$, which pass upward over the friction drums $9^d$ that are supported on the intermediate relatively stiff portion of the main spring 1, then pass downwardly around another pair of friction drums $15^d$, that are supported on the axle 6, and then pass outwardly and upwardly, around a guide on the outer end of the lever $11^d$, to the main lever connections $10^d$. When the system is subjected to a kinetic increase in load the parts will be moved from the normal load position shown in Fig. XIII toward, and ultimately to, the position illustrated in Fig. XIV. In this movement the lever elements 3ᵈ are rocked downwardly, and impose an increased pressure on the upper ends of the supplemental springs 7ᵈ. But the lower ends of these springs are concurrently moved downwardly as the drums, 9ᵈ and 15ᵈ, approach each other—the rate of this movement being governed by the sliding of the flexible connectors 8ᵈ on and over the drums 9ᵈ and 15ᵈ—and the rate of compression of the elastic suspension elements is determined by the ratio between the concurrent motions of the two lever members 3ᵈ and 11ᵈ. When the compression movement has carried the parts to the position shown in Fig. XIV the movement of the lever support 11ᵈ is arrested, by the engagement of the cross lug 11ᵈᵈ thereof with the axle 6; and any further approach of the body and axle parts will result in a substantially increased rate of compression of the supplemental springs 7ᵈ, because the lower ends of these springs are now held in fixed relation to the axle member. The recoil movement of the system— from the position shown in Fig. XIV to that shown in Fig. XIII—is restrained, in part by the frictional drag of the strap connections, 8ᵈ on the surface of the friction drums 9ᵈ and 15ᵈ—(this frictional resistance being greatest at the beginning of the return movement, and being gradually reduced as the pressure on the supplemental spring elements 7ᵈ is relieved)—and in part by the downward pull of the strap connections 8ᵈ on the upwardly moving lever elements 3ᵈ, which tends to establish and maintain a prenormal or supernormal tension on the supplemental springs. Any rebound movement above the normal load position shown in Fig. XIII is also resisted by the frictional drag of the strap elements 8ᵈ on the surface of the drums 9ᵈ and 15ᵈ; and is further resisted by the concurrent movement of the levers 3ᵈ and 11ᵈ toward each other— under the pull on the ends of the straps 8ᵈ— and the resultant compression of the supplemental springs 7ᵈ. When this movement has been sufficient to bring the cross lug 11ᵈᵈ against the lower side of the main spring 1, the rate of compression of the supplemental springs is greatly accelerated, because the movement of the connectors 8ᵈ is then transmitted in its entirety to the lever connection 10ᵈ; and any excessive rebound movement—like any unusually large compression movement—is therefore very quickly absorbed and checked by an accelerated elastic resistance to such movements.

In all of the constructions so far described (Figs. I to XIV inclusive) the supplemental spring-snubber suspension elements are symmetrically arranged on opposite sides of the body—each end of the main leaf spring being provided with a set of these elements— and it will be observed that the arrangement is such that the oppositely directed pull, or thrust, of the supplemental spring elements on the two sides of the body frame, and the symmetrically opposed tensions in the two sets of snubber strap connections, both coact and cooperate in holding the body frame in centered position with respect to the axle frame, and in preventing, or strongly resisting, any side sway or relative lateral displacement of the spring connected parts of the chassis assemblage. This feature of construction is an important one in all cross leaf spring systems—and is particularly advantageous in my improved system which provides for relatively large, and relatively free, vertical movements of the axle under compressive shocks—for the reason that any decided tendency to lateral oscillation or transverse rocking of the tonneau is not only uncomfortable, but also more or less dangerous, because it interferes with the stability of riding and the safety and ease of steering.

As shown in the third sheet of drawings— Figs. XV to XXII inclusive—my invention is also applicable to various forms of the ordinary side leaf spring construction, in which the central stiff portion of the primary suspension member is rigidly bolted to the running gear frame, and in which the ends of this member are flexibly connected to the body frame. In the application of my invention to these constructions the supplemental spring-snubber members may be so arranged that either one or both ends of the main spring are elastically supported by the secondary springs; but in the simple exemplifications here presented one end of the main spring is connected to the body in the usual manner (as illustrated, for example, in Figs. XIX and XX) and the other end is provided with the supplemental lever spring suspension.

In the form of construction shown in Figs. XV, XVI and XVII the outer end of the main said leaf spring 1ˢ is pivotally connected to the intermediate portion of a short lever 3ᵉ, which is supported, at its outer end, on shackle links 4ᵉ that are suspended from the body frame bracket 5ᵉ. The inwardly projecting portion of the lever 3ᵉ is rigidly connected to the thick end of a supplemental leaf spring element 7ᵉ; and the inner end of this element is in turn, attached to, and supported by, a flexible strap or connector 8ᵉ, that passes downwardly around a friction drum 9ᵉ (that is mounted on the axle bracket, 14ᵉ), then passes upwardly and outwardly around guide blocks 15ᵉ and 16ᵉ, (that are attached to the body frame 2), and is attached at its outer end to the inwardly projecting part of the lever 3ᵉ.

The operation of this improved side leaf spring suspension system is substantially the same as that of the various cross leaf spring systems which have been previously described, and does not, for that reason, require any extended explanation. The action of the system under an increased kinetic load will be obvious from an inspection of Fig. XVI—which shows the position of the parts at the time when movement of the inner end of the leaf spring 7ᵈ has been arrested by contact with the body frame—and the reverse action of the system under rebound stresses will be equally plain from an inspection of Fig. XVII, which shows the parts in the position in which the inner end of the leaf spring 7ᵉ has been brought into engagement with the surface of the friction drum 9ᵉ, and in which further expansion of the system will result in a rapidly increased flexural movement of the lever spring elements 3ᵉ—7ᵉ, under the pull of the longitudinally rigid connector 8ᵉ.

Fig. XVIII illustrates a slight modification of the construction shown in Figs. XV–XVIII, and shows how the outer end of the strap connection 8ᵉ may be connected with the lever spring system in such manner as to concurrently impose an increased flexure on both the secondary and the primary spring elements of the suspension system. In this modification the shackle connection between the parts 3ᵉ and 5ᵉ is a two-part member, which comprises a T shaped block 19ᵉ that is pivoted, at its lower end, in the forked outer extremity of the lever 3ᵉ, and a pair of links 20ᵉ that connect the upper end of the block 19ᵉ with the body bracket 5ᵉ. The outer end of the strap 8ᵉ is connected to the legs of the T shaped block 19ᵉ, and the links 20ᵉ are provided with end lugs 21ᵉ, which are adapted to engage with the upper end of this leg when the elements are moved to the dotted line positions shown in the figure. When the system is subjected to normal load stress—and to any kinetic increase in such stress—the tension on the connection 8ᵉ, is relaxed, and the end pressure on the shackle elements holds the leg of the block, 19ᵉ in close engagement with the inner edges of the links 20ᵉ—as shown in full lines in Fig. XVIII—so that the partially folded elements act as a longitudinally rigid member during the compression movements. But during the recoil and rebound movements the tension in the strap 8ᵉ is greatly increased (by means of the frictional resistance to its movement over the drum 9ᵉ) and the end pressure on the shackle connection is reduced; and the pull of the connector 8ᵉ on the block 19ᵉ will draw, or tend to draw, the latter inwardly and into alignment with the links 20ᵉ—as shown in the dotted lines—and will thereby concurrently move the outer end of the lever 3ᵉ, and the adjacent end of the main spring 1ˢ, away from the body bracket 5ᵉ. This action subjects the supplemental lever-spring elements 3ᵉ—7ᵉ to a rotative force, and the main spring 1ˢ, to a transverse thrust, that cooperates with the frictional resistance to the relative movements of the strap and drum elements, 8ᵉ—9ᵉ—15ᵉ—16ᵉ, in first restraining and damping the return of the parts to normal load position (Fig. XV), and then resisting and checking the rebound of the system beyond that position; and the effect of the expanding shackle action is greatly accentuated after the parts have passed the position of Fig. XVII and the pull on the strap 8ᵉ is effective solely in producing relative movement of the connected elements, 19ᵉ, 20ᵉ, 3ᵉ and 1ˢ. This movement is arrested, just before the shackle members 19ᵉ—20ᵉ have reached their dead center position, by the engagement of the lugs 21ᵉ with the head of the block 19ᵉ; and the parts are so proportioned that the maximum elongation of the expanding shackle is preferably greater than the maximum separation of the body and axle parts beyond their normal load position.

Figs. XIX, XX and XXI illustrate another form of side leaf spring construction which closely resembles the structural organization shown in Figs. XV, XVI and XVII. In this seventh exemplification of my improvements the outer extremity of the lever 3ᶠ is pivotally coupled to the adjacent eye end of the main spring 1ˢ; and the intermediate part of the lever is pivoted on the body frame bracket 5ᶠ. The other extremity of this rocking member is forked and carries a pair of supplemental leaf springs 7ᶠ—7ᶠ which are symmetrically disposed, one on each side of the primary suspension member 1ˢ, and are attached, at their inner ends, to a pair of flexible straps 8ᶠ—8ᶠ, that pass up over curved guide blocks 9ᶠ—9ᶠ (which are mounted on the opposite sides of the body sill 2) and then down to a clamp block 12ᶠ, which serves to adjustably connect these straps to a single flexible band 8ᶠᶠ. This single connector passes through a curved slot in the axle bracket 15ᶠ, and is then carried outwardly, under a cross bolt on one of the main spring clips 16ᶠ, and upwardly between the forks of the lever 3ᶠ to a fixed connection 10ᶠ on the expanded hub of the last mentioned member.

The functional operation of the various parts of the system just described is substantially identical with that of the construction shown in Figs. XV, XVI and XVII. When the body and axle members are moved toward each other—from the normal load position of Fig. XIX to the compression position of Fig. XX—the lever 3ᶠ is rocked in a clockwise direction on its pivot support 5ᶠ, and the inner ends of the springs 7ᶠ are concurrently lowered (by the free movement of the straps 8ᶠ over the guide blocks 9ᶠ); and the flexural resistance of the elastic suspension members is gradually increased until the coupling block 12ᶠ is brought into engagement with the guide blocks 9ᶠ (Fig.

XX) and is then more rapidly increased as the compression movement continues. The recoil and rebound movements (from the position shown in Fig. XX to the successive positions of Figs. XIX and XXI) is resisted, as before, by the frictional drag of the straps $8^f$—$8^{ff}$ on and over their guide supports $9^f$—$15^f$—$16^f$, and by the concurrent pull of these straps on the lever connection $10^f$—which tends, as already explained, to first check the recoil of the abnormally compressed springs, and then produce a prenormal and supernormal flexure thereof;—and when the rebound movement has brought the ends of the supplemental springs into engagement with the lugs on the sides of the guide blocks $9^f$ (as shown in Fig. XXI) any further separation of the body and axle frames results in a greatly accelerated rotation of the lever $3^f$ and a correspondingly magnified flexure of the secondary suspension elements.

The amount of differential movement between the lever member $3^f$ and the supplemental spring-strap-connections $7^f$—$8^f$ depends on the ratio between the lengths of the two opposing arms of the lever elements (i. e. the "power" arms and the "weight" arms), and upon the arrangement of the strap and drum connections between the two relatively movable portions of the chassis assemblage. The rate of movement of those ends of the springs which are attached to the rocking lever elements—as compared to the lineal movement of the relatively oscillating body and axle members—can be varied, to any desired degree, by changing the relative lengths of the lever arms; and the rate of movement of the other ends of the springs can also be varied, within certain limits, by increasing the number of strap sections which are engaged by the opposing guide blocks on the body and axle frames. In the various forms of construction thus far described these strap and drum connections constitute, in effect, a "single-fall" tackle-block assemblage, in which the movement of the free end of the strap or cord is approximately double the relative lineal movements of the block and guide supports. The diagram of Fig. XXII shows how this strap-spring movement can be increased to substantially three times the relative lineal movement of the body and axle parts by passing the strap first around a friction guide block $9^i$ (that is attached, for example, to the axle frame) then upwardly around a pulley $15^i$ (that is mounted on the body frame) then downwardly again around another guide block $22^i$ on the axle bracket, and then outwardly to the extension $10^i$ of the actuating lever. The functional action of this system on compression and expansion movement is indicated by the dotted lines of the diagrammatic figure; and is precisely the same as that of the heretofore described systems.

My invention is also applicable to those forms of quarter elliptic side spring suspensions which are generally designated as cantilever spring supports; and Figs. XXIII to XXVII inclusive illustrate two such exemplifications of my improvements. In such applications the flexible ends of the main spring, which are usually secured to pivotally mounted axle brackets, are cut off, and are provided with special clips which serve to pivotally connect these flexible extremities with adjacent portions of the supplemental lever elements.

In the construction illustrated in Figs. XXIII, XXIV, XXV, the supplemental lever-spring member comprises a block $3^k$, which is rotatably mounted on the axle 6; a relatively stiff 4-ply leaf spring $7^k$, which is rigidly secured at its thick end to the lever block $3^k$; and a pair of volute coil compression springs $7^{kk}$, whose bases are supported on a plate 24 (that is riveted or otherwise suitably secured to the flexible end of the leaf spring $7^k$), and whose vertices are connected with, and supported by, a pair of strap elements $8^k$, that pass up over the curved lateral extensions on a main spring clip block $9^k$ and are carried rearwardly to a coupling block $12^k$, which serves to connect them with a single central strap extension $8^{kk}$. The last mentioned connector is continued rearwardly to a second guide block $15^k$, which is bolted to the body frame, and it is then carried downwardly and attached to the extension $10^k$ on the rear side of the lever element $3^k$. The action of this system under an increased kinetic load is illustrated in Fig. XXIV; and, as there shown, the relative approach of the body and axle members 2 and 6—and the accompanying flexure of the main spring $1^k$—rocks the supplemental lever-spring system downwardly. The relative approach of the axle supported lever element $3^k$, toward the body and main spring guide blocks $15^k$—$9^k$, permits the ends of the straps $8^k$ to also move downwardly; and the differential movement between the two ends of the supplemental spring elements, $7^k$—$7^{kk}$, subjects the latter to a gradually increased flexure during the greater part of the compression movement. But when the elements have reached the position shown in Fig. XXIV the lever connected end of the strap $8^{kk}$ engages with the body bracket $15^k$, and thus arrests further downward movement of the outer spring connected ends of the associated straps $8^k$—$8^k$; and any further approach of the body and axle parts subjects the spring suspension elements to a greatly increased rate of flexure, that will quickly check unusual or excessive compression of the system. The recoil of the compressed springs from the position of Fig. XXIV toward, and to, that of static equilibrium (Fig. XXIII), is restrained and damped, in the same manner as in the previously described systems, by the combined frictional resistance of the return movement of the straps over the friction drums $9^k$ and $15^k$, and by the coacting pull of the strap connection $8^{kk}$ on the rearwardly projecting extension $10^k$ of the lever, $3^k$. In the normal load position the outer end of the supplemental leaf spring $7^k$ is engaged with the main spring clip bracket $9^k$; and any separation of the parts above this position is restrained and quickly checked, in part by the frictional resistance to the further movement of the strap elements over the guide blocks, $15^k$ and $9^k$, and in part by the direct axial compression of the coil springs $7^{kk}$; and this last element of elastic restraint may also be supplemented by some rotation of the connected lever leaf spring elements $3^k$—$7^k$ under the pull of the strap $8^{kk}$ on the lever extension $10^k$. If desired the coupling block $12^k$ may also be so positioned that an extreme rebound movement will bring this block into engagement with the guide block $15^k$; and, under such circumstances, further separation of the body and axle members will be attended by a greatly accelerated rotative movement of the supplemental lever-spring combination, and a correspondingly augmented flexure of both the leaf and coil springs $7^k$ and $7^{kk}$.

In the modified structural arrangement shown in Figs. XXVI and XXVII the lever member $3^m$ is pivotally mounted, as before, on the axle 6; is pintally connected, at an intermediate point in its length, to the clip $4^m$ at the shortened end of the main cantilever leaf spring; and is attached, at its inner offset end, to a coil tension spring $7^m$. The opposing extremity of this coil spring is supported on an arm $11^m$, that extends from one side of a recessed friction disc $8^m$, which is rotatably supported on a cooperating drum $9^m$, that is mounted on the body frame 2;—these relatively rotatable parts being held in desired frictional engagement by means of the nut and spring washer elements $13^m$—$13^{mm}$. The disc $8^m$ is also provided with a second arm $12^m$, which is attached, at its outer end, to a link $8^{mmm}$, that serves to connect this arm to the pin connection $10^m$ at the rear end of the lever $3^m$. When this system is subjected to kinetic increases in load the parts are moved from the full line position of static equilibrium toward the dotted line positions of Fig. XXVI; and the supplemental spring elements $7^m$ are gradually expanded, and increasingly flexed, by the relative separation of the ends of the lever arms $3^m$ and $11^m$. The initial tension of the spring $7^m$ is preferably such that the elastic pull on the outer end of the arm $11^m$—which is controlled by the upward thrust of the link $8^{mm}$ on the rear end of the arm $12^m$—is sufficient to overcome the preadjusted frictional resistance between the relatively movable elements $8^m$ and $9^m$; and the compression movement of the system is therefore restrained, almost entirely, by the gradually increased elastic resistances of the spring supports. When the parts recoil from their compressed positions toward the normal load position of Fig. XXVI (as there shown in full lines) the pull of the link connector, $8^{mm}$, on the arm, $12^m$, will rotate the friction disc $8^m$ in a counter-clockwise direction, against the pull of the expanded coil spring $7^m$; and the pull of this same link on the lever connection $10^m$ will concurrently tend to restrain the contraction of this coil spring, and impose upon it a prenormal stress and flexure, which will cooperate with the frictional resistance of the members $8^m$—$9^m$ in effectively damping the recoil movements. Any expansion of the system beyond normal load position—such as is illustrated in Fig. XXVII—will likewise be resisted, and quickly checked, by the frictional resistance to the movements of the disc and drum members $8^m$—$9^m$, and the cooperative and concurrent expansion and increased flexure of the tension coil $7^m$; and in the case of rebound this joint control of the movement is so effective that any considerable expansion of the system is prevented.

It is of course obvious that the longitudinal rigid connector $8^{mm}$, which is employed in the last described construction, may be replaced by a flexible strap; such as is illustrated at $8^{kk}$ in the analogous construction of Figs. XXIII and XXIV; and if this is done the rotative movement of the friction disc $8^m$ may be arrested at predetermined points, by suitable stops on the stationary drum frame $9^m$, so as to obtain an accelerated rate of flexure of the supplemental coil $7^m$, after the body and axle frames have moved a certain distance with respect to each other. The effect of these stop elements, if used, is the same as that obtained in the previously described constructions such, for example, as those illustrated in Figs. I to VII, X to XIV, XIX to XXI etc. and does not, for that reason, need to be particularly explained.

The organization depicted in Figs. I to XXVII inclusive are all of the lever-actuated supplemental spring species—in which the movement of the main spring is multiplied and communicated to the secondary suspension member by means of a lever of the first or second class; but my invention can also be utilized in connection with what are termed direct connected supplemental spring suspensions, where the ends of the primary elastic support are directly coupled to, and carried by, the secondary springs, and the latter are, in turn, mounted and supported either on rigid portions of the body or axle frames or on "bridge" members that extend from one to the other of these relatively movable parts. Figs. XXVIII to XXXII inclusive depict two applications of my present improvements to cross leaf spring systems of this direct connected and bridge supported type.

In the structure shown in Figs. XXVIII and XXIX, each end of the main leaf spring 1 is flexibly coupled, by the links 26, to the vertex of a single volute coil compression spring $7^n$. The base end of this coil is supported in a recessed seat on an L shaped bridge member 27, which also carries a radius arm guide 28, that engages with the upper end of the link 26, and thus serves to hold the two ends of the spring $7^n$ in substantial alignment during its compression and expansion movements. The member 27 is pivotally mounted on the reversed axle perch 5, and is held in position by the action of a flexible strap $8^n$, which is attached, at its outer extremity, to an upwardly extending lug $10^n$ on the radius arm 28; is carried under a roller guide 29 on the long arm of the bridge support; is then passed over a friction drum 9 on the body frame 2; and is connected, at its inner extremity, to a U shaped shackle link $8^{nn}$, that is coupled, at its lower end, to an axle clip, 30.

The operation of this form of my improved organization is as follows: Where the system is subjected to a kinetic increase in load stress the body and main spring parts will be moved toward the axle members, and the pull of the links 26 will impose an increased flexure stress on the supplemental coil springs $7^n$. But this approach movement will also permit the flexible strap $8^n$ to slide freely over the frame supported drum $9^n$, and will allow the bridge member 27 to rock downwardly, thus reducing the amount of added compression that would otherwise be imposed on the elastic suspension elements. When the parts have reached the position shown in Figs. XXIX—where some portion of the rocking bridge has engaged with the upper surface of the main leaf spring 1,—the further slacking of the connections $8^n$—$8^{nn}$ will have no further control on the rocking movement of the supplemental spring support; and the compression of the latter will therefore proceed at an accelerated rate as the body and axle members continue to approach each other. When the excess compression stress is relieved, the recoil of the compressed system, toward, and to, the normal load position of Fig. XXVIII, is restrained and damped by the frictional resistance to the accompanying movement of the strap connection $8^n$ over the friction drum $9^n$, and also by the pull of the outer end of this strap on the radius arm projection $10^n$, which exerts a downward thrust on the link 26 and thereby serves to retard the free expansion of the supplemental spring elements, $7^n$, or to impose a prenormal flexure thereon. Any rebound of the system above the position of Fig. XXVIII is similarly restrained, to an even greater degree, by the same combination of frictional and elastic resistances.

In the modified construction shown in Figs. XXX, XXXI and XXXII each supplemental spring suspension element comprises two volute coil springs $7^o$, which are supported on rotatable discs $8^o$, that are summetrically disposed on the opposite sides of a drum member $9^o$, which is, in turn, rigidly attached to, and forms an extension of, the reversed axle perch, 5. The disc and drum members are held in preadjusted frictional engagement with each other by the nuts and spring washers $13^o$—$13^{oo}$; and the disc members are provided with inwardly extending arms $27^o$, that are bolted together and carry, at their inner ends, a pivot support for a Y shaped lever $28^o$. The outer flaring arms of this lever are pintally coupled to the heads of link bars $26^o$—$26^o$, which engage with the vertices of the supplemental springs $7^o$—$7^o$, and are connected, at their lower ends, with the adjacent extremity of the main leaf spring 1. The inner single arm of the lever $28^o$ is shackled to the body frame 2, by a link $8^{oo}$. When this spring support system is subjected to a kinetic increase in load the parts will be moved from the full line position shown in Fig. XXX toward the dotted line positions of that figure; and in this movement both the upper and the lower ends of the supplemental springs will be moved downwardly by varying amounts that are determined by the relative rotation of the members $8^o$ and $28^o$, under the pull of the respective links $26^o$ and $8^{oo}$. The thrust of the spring $7^o$, on the off set seats of the disc $8^o$, is sufficient to overcome the frictional resistance to the rotation of these discs on the fixed drum support $9^o$, when the parts are moving in the direction last indicated; and this frictional resistance does not therefore sensibly modify the elastic restraint that is imposed on the approach of the body and axle parts. But when the parts begin to return from their compressed position, toward the normal load position of Fig. XXX, the pull of the link member $8^{oo}$, on the inner end of the arm $28^o$, will impart a corresponding movement to the disc arms $27^o$, and rotate the discs on their drum supports $9^o$ in a direction opposed to the thrust of the supplemental springs $7^o$; while the outer ends of the lever $28^o$ will concurrently exert an increased pressure on the tops of the supplemental suspension elements, and tend to retard their expansion or to impose an increased prenormal flexure thereon. The recoil movement of the system is therefore damped, in the same manner as in the previously described constructions, by a combined frictional and elastic resistance which is greatest at the beginning of the return movement and greatly diminishes as the parts approach the position of static equilibrium. Any rebound of the system—which will carry the parts from the position of Fig. XXX toward the position of Fig. XXXI—will be correspondingly retarded, to an even greater degree, by this same combination of frictional and elastic resistance; the frictional resistance being due to the rotation of the disc 8° on the drum support 9°, and the elastic resistance being due to the relative closing movement of the pivotally connected arms 27°—28°, that serves to progressively move the opposed ends of the supplemental springs 7° toward each other.

What I claim is:

1. In a spring suspension system for two relatively movable members the combination of a plurality of elastic support elements operatively connected in series between the said members, with means for concurrently shifting opposing ends of one of said elements in the direction in which it is flexed by a relative bodily movement of the said members.

2. An elastic support system for vehicle bodies which comprises a plurality of springs interposed in series relationship between the body and axle members, and means for concurrently shifting the position of one of said springs when the said members are displaced from normal load position of the opposed ends, to thereby diminish the ratio between the said displacement and the resultant flexure of the elastic support elements.

3. An elastic support system for two relatively movable members which comprises a plurality of series connected springs interposed therebetween, and means for effecting a differential movement of the ends of one of these springs with respect to the others when the said members are displaced from normal load position; whereby the change in the elastic flexures of the said springs are reduced for a predetermined displacement of the said members.

4. In a shock absorber system for two relatively movable bodies the combination of a main spring coupled to one of the said bodies, a supplemental spring connected in series with the said main spring, a movable support for the said supplemental spring, and means for moving said support concurrently with, and in the same direction as, the series connected parts of the said springs are moved.

5. A shock absorber system for relatively movable parts which comprises a plurality of series of connected springs interposed therebetween, means for rigidly supporting one of said springs on one of said movable parts, other means for flexibly supporting another of said springs on one of said parts, and means for moving said supporting means concurrently with, but at a different rate than, the relative approach or recession of the said parts.

6. A shock absorber system for two relatively movable members which comprises a plurality of elastic elements interposed therebetween, means for securing one of said elements in fixed relation to one of said members, means for operatively connecting said elements in series with each other, and means for supporting one of these connected elements in progressively variable position to both of the said members.

7. In an elastic support system for the body and axle members of a vehicle, the combination of a main spring secured to, and movable with, one of said members, a supplemental spring operatively connected in series with the said main spring, and means for supporting one portion of said supplemental spring in progressively varied relationship to both of the said members.

8. In a shock absorber system for two relatively movable members, the combination of a main spring rigidly attached to one of the said members, a supplemental spring coacting in series with the said main spring, a movable support for one end of said supplemental spring, and means for moving said support relatively to both of the said members when the latter are displaced from the position of static equilibrium.

9. In a spring suspension system for two relatively movable bodies the combination of a plurality of elastic support elements interposed therebetween, means for relatively shifting the position of one of said elements as a whole in the direction in which it is flexed by the approach movement of the said bodies, and other means for arresting this shift in position when the said approach movement has reached a predetermined limit.

10. An elastic suspension system for vehicle bodies which comprises a plurality of series connected springs, coacting to restrain relative movements of the said body with respect to its axle support, means for moving one of the said springs as a whole in the direction in which it is flexed by such movement, and other means for limiting this bodily movement to a predetermined range on both sides of normal load position.

11. A shock absorber system for two relatively movable parts which comprises the combination of a plurality of series connected springs interposed therebetween, means for progressively varying the position of one of these springs with respect to both of said parts, and other means for arresting this progressive movement of the said springs with respect to one of the said parts when the said members are subjected to a predetermined displacement.

12. A shock absorber system for two relatively movable parts which comprises the combination of a plurality of series connected springs interposed therebetween, means for progressively varying the position of one of these springs with respect to both of said parts, and other means for arresting this progressive movement of the said springs with respect to one of the said parts when the said members are subjected to a predetermined displacement in either direction from the position of static equilibrium.

13. In a shock absorber construction for two relatively movable members the combination of a spring support interposed between said members, means for moving said spring as a whole in the direction in which it is increasingly flexed by the relative displacement of the members from the position of static equilibrium, and means for snubbing the return of the flexed spring to the said position.

14. In a shock absorber system for vehicles the combination of a plurality of springs interposed in series between the body and axle members of the vehicle, means for moving one of these springs bodily in the direction of its flexural movement when the said members are displaced from normal load position, and means for frictionally resisting the recoil of the displaced elements toward said position when the displacement stresses are relieved.

15. A shock absorber system for relatively movable bodies which comprises a main spring, a supplemental spring coacting in series therewith to elastically restrain displacements of the said bodies from the position of normal or static equilibrium, means for bodily shifting the operative position of one of said springs when the said bodies are so displaced, and means for resisting the return of the shifted spring to said normal position when the displacement stresses are relieved.

16. A shock absorber system for vehicle bodies which comprises the combination of a plurality of elastic support elements interposed between the body and axle members of the vehicle, with means for bodily shifting the operative position of one of these elements when the said members are displaced from normal load position, means for limiting this shifting movement to a predetermined range of action, and means for restraining the return of the displaced and shifted parts to said normal position.

17. In a shock absorber organization the combination of a spring interposed between two relatively movable parts, means for bodily shifting the position of the said spring with respect to both of the said parts when the latter approach each other, and other means for holding said spring in fixed relation to one of the said parts when the said approach movement exceeds a predetermined value.

18. A shock absorber organization for vehicle bodies, which comprises a plurality of springs interposed between the body and axle members of the vehicle, and acting to elastically resist the relative approach of said members, means for bodily shifting the position of one of said springs in concurrence with such approach movements, and other means for holding all of said springs in fixed operative position with respect to one or the other of the said members when the said approach movements exceed a predetermined range and also when the said members are separated beyond normal load position.

19. In a suspension system for two relatively movable members the combination of spring elements interposed between said members, means for bodily changing the position of one of said springs and thereby diminishing the flexural movement thereof when the said members are forced toward each other, means for limiting this change in position to a predetermined amount, and means for resisting the return of the displaced parts to normal load position, and for restraining their rebound beyond said position.

20. In a shock absorber organization for two relatively movable bodies the combination of a plurality of springs for cooperatively resisting the relative movements of said bodies from the position of static equilibrium, a movable support for one of said springs, and flexible connections between the said support and the said bodies whereby the said spring is shifted in the same direction as it is flexed when the bodies move in one direction from the said position and is held against such shifting and is increasingly flexed when the bodies move in the opposite direction.

21. In a shock absorber system for vehicles the combination of a plurality of spring suspension elements interposed between the body and axle members of the vehicle and acting to elastically resist the compression of the system, with a movable support for one of the said springs and means for shifting said support with respect to both of said members, other means for preventing said shifting beyond predetermined limits, and means for imposing a progressively increased flexure on the movably supported spring when the system expands beyond normal load position.

22. An elastic suspension system for two relatively movable bodies which comprises a spring, a support therefor, means for moving said support in the direction in which the spring is flexed when the said bodies are displaced in one direction from the position of static equilibrium to thereby decrease the attendant flexure of the said spring, and other means for arresting the movement of the spring support and subjecting the said spring to an augmented flexure when the bodies are moved in the opposite direction from the said position.

23. A shock absorber organization for vehicle bodies which comprises the combination of spring elements interposed between the body and axle members of the vehicle chassis, means for changing the operative position of one of the said elements in concurrence with the relative displacements of the said members from normal load position, means for confining this change in operative position to predetermined limits, means for restraining the return of the displaced parts to the normal position, and other means for imposing a progressively increased flexure on one of the said springs when the said parts are separated beyond said normal position.

24. A suspension system for two relatively movable bodies which comprises a main spring rigidly supported on one of said bodies, a supplemental spring operatively connected at one end to the adjacent position of the said main spring, a support for the opposite end of the said supplemental spring, means for moving said support in the same direction as the supplemental spring is flexed when the system is subjected to compression stresses, means for arresting this motion of the supplemental spring support when the compression stress exceeds a predetermined value, and means for restraining the free return of the parts to normal load position when the compression stress is relieved.

25. A suspension system for two relatively movable bodies which comprises a main spring rigidly supported on one of said bodies, a supplemental spring operatively connected at one end to the adjacent position of the said main spring, a support for the opposite end of the said supplemental spring, means for moving said support in the same direction as the supplemental spring is flexed when the system is subjected to compression stresses, means for arresting this motion of the supplemental spring support when the compression stress exceeds a predetermined value, means for restraining the free return of the parts to normal load position when the compression stress is relieved, and other means for imposing a progressively increased flexure on the said supplemental spring when the system is expanded beyond the said position.

26. A shock absorber system for vehicle body suspensions, which comprises a main spring, a supplemental spring, a flexible connection between two adjacent portions of the said springs, a support for another portion of the supplemental spring, and coupling elements conjoining said support with one of the body members and with the said flexible connection.

27. A suspension system for two relatively movable members which comprises a pair of springs interposed in operative series relationship between said members, a support for one extremity of one of said springs, and a flexible connection conjoining said support with both of said relatively movable members.

28. A suspension system for two relatively movable members which comprises a pair of springs interposed in operative series relationship between said members, a support for one extremity of one of said springs, and a flexible connection conjoining said support with both of said relatively movable members and acting to move the said support in the direction of the relative displacement thereof.

29. A suspension system for two relatively movable members which comprises a pair of springs interposed in operative series relationship between said members, a support for one extremity of one of said springs, and a flexible connection conjoining said support with both of said relatively movable members and acting to accelerate the movement of said support with respect to the relative movement of the said members.

30. A shock absorber organization for vehicle bodies which comprises an elastic support interposed between the body and axle members, mounting for one end thereof, and flexible means conjoining said mounting with both of the said members whereby the said mounting is moved whenever either member is displaced from normal load position.

31. A suspension system for two relatively movable bodies which comprises a spring, a connection between one portion thereof and one of the said bodies, and a coupling unit conjoining another portion of the spring with both of said bodies and acting to diminish the flexural strain imposed on the said spring by the relative displacement of the bodies from the position of static equilibrium.

32. In a shock absorber organization for vehicle body suspensions the combination of a spring operatively connected to one of the relatively movable members of the chassis assemblage, a flexible coupling element conjoining said spring with both of the said movable members and acting to diminish the flexural strain imposed thereon by the compression of the suspension system, and a friction grip cooperating with said coupling element to restrain the recoil of the chassis members from the compressed position.

33. In a shock absorber organization for two relatively movable members the combination of a spring interposed between said members and operatively connected to one of them, a flexible coupling conjoining another portion of the same spring to both of said members and acting to move that portion in the direction of the flexural movement induced therein by the displacement of the said members from the position of static equilibrium, and friction means for retarding the free return of the conjoined parts to the said position.

34. A suspension system for vehicle bodies which comprises a spring interposed between the body and axle members and operatively connected at one end to one of the said members, a support for the opposite end of the said spring, a flexible coupling element conjoining said support with both of the said members, and a friction mechanism for restraining the movements of the said coupling element in one direction.

35. A shock absorber organization for elastically suspended systems which comprises the combination of a spring, a flexible connection between one portion of said spring and one part of the suspended system, a movable coupling conjoining another portion of the same spring and two relatively movable parts of the said system and acting to diminish the flexural strain imposed thereon by the relative movement of the said parts, a stop for limiting the motion of the said flexible connection to a predetermined range of action, and a friction mechanism for restraining the elastically controlled movement of the suspended parts.

36. In a shock absorber suspension system for vehicle bodies, the combination of a spring support therefor that is operatively connected at one point to one of the relatively movable body-axle members of the vehicle, a mounting for another portion of the same spring, a friction drum mounted on one of said vehicle members, and a flexible connection extending from said mounting to said drum and thence to the other relatively movable vehicle member.

37. A shock absorber organization for the relatively movable body and axle parts of a vehicle chassis which comprises a lever pivotally supported on one of the said parts, a spring connected at one end to an adjacent portion of the said lever, a movable support for the opposite end of the said spring, and a flexible connection conjoining said support with one of the said vehicle parts, and with another portion of the said lever.

38. In a suspension system for relatively movable bodies the combination of a spring interposed between said bodies, a lever pivotally supported on one of them and flexibly coupled to one portion of the said spring, a movable support for another portion of the spring, a flexible connection conjoining said support with one of said movable bodies and also with the said lever, and a friction mechanism operatively associated with the said flexible connection and acting to restrain the free relative movement of the said bodies.

39. In a shock absorber organization the combination of a main spring interposed between the body and axle members of the vehicle, a supplemental spring, a rocking connection between the main spring and one end of the supplemental spring, a movable support for the other end of said supplemental spring, and a flexible coupling between said support and said rocking connection.

40. A shock absorber organization for vehicles which comprises a main spring interposed between the body and axle members, a supplemental spring, a rocking connection between the main spring and one extremity of the supplemental spring, a support for the other end thereof, a flexible coupling conjoining said support with the said rocking connection and with one of the said members, and a friction mechanism for restraining the free oscillatory movement of the connected parts.

41. A shock absorber organization for vehicle body suspensions which comprises a main spring, a supplemental spring, a lever pivotally supported on one of the relatively movable chassis members, flexible connections between said lever and the said springs, a movable support for one end of the supplemental spring, a friction drum mounted on one of the said chassis members, and a flexible connection extending from said movable support to said friction drum and thence to the said lever.

42. A shock absorber organization for vehicle body suspensions which comprises a main spring, a supplemental spring, a lever pivotally supported on one of the relatively movable chassis members, flexible connections between said lever and the said springs, a movable support for one end of the supplemental spring, a friction drum mounted on one of the said chassis members, a flexible connection extending from said movable support to said friction drum and thence to the said lever, and stops for limiting the action of the said flexible connection.

43. In a shock absorber organization for vehicles the combination of a spring interposed between the body and axle members thereof, a lever rotatably mounted on one of said members and attached to one portion of said spring, a movable connection conjoining another portion of the spring with the said lever and with another of the said members, and means for adjusting the operative length of the said connection and thereby altering the relative movements of the connected parts.

44. In a shock absorber organization for two relatively movable bodies the combination of a lever rotatably mounted on one of the bodies, a spring operatively attached to one portion of the said lever, a flexible connection between the said spring and the said lever, and means for shifting the point of attachment of the said connection to the said lever and thereby altering the ratio between the movements of the connected parts.

45. A spring suspension system for vehicle bodies which comprises a spring interposed between the body and axle parts of the vehicle, a rocking member pivotally supported on one of said parts and attached to one portion of the said spring on one side of its pivot support, and a flexible connection conjoining another portion of the said spring with the said lever on the opposite side of the pivot support therefor.

In testimony whereof I have hereunto set my hand.

FRANK L. O. WADSWORTH.